(12) United States Patent
Godard et al.

(10) Patent No.: US 10,099,954 B2
(45) Date of Patent: *Oct. 16, 2018

(54) MICROWAVE-BASED GLASS LAMINATE FABRICATION

(71) Applicant: Corning Incorporated, Corning, NY (US)

(72) Inventors: Hilary Tony Godard, Duluth, MN (US); Gaozhu Peng, Horseheads, NY (US); Irene Mona Peterson, Elmira Heights, NY (US); Rebecca Lynn Schulz, Horseheads, NY (US); Gary Graham Squier, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 14/743,415

(22) Filed: Jun. 18, 2015

(65) Prior Publication Data

US 2015/0284282 A1    Oct. 8, 2015

Related U.S. Application Data

(62) Division of application No. 13/183,705, filed on Jul. 15, 2011, now Pat. No. 9,090,505.

(51) Int. Cl.
*C03B 13/10* (2006.01)
*C03B 17/00* (2006.01)
(Continued)

(52) U.S. Cl.
CPC ............ *C03B 17/067* (2013.01); *C03B 13/10* (2013.01); *C03B 17/02* (2013.01); *C03B 17/064* (2013.01);
(Continued)

(58) Field of Classification Search
CPC ..... C03C 23/0065; C03B 13/10; C03B 17/02; C03B 17/067; C03B 17/064;
(Continued)

(56) References Cited

U.S. PATENT DOCUMENTS 3,509,015 A    4/1970   Wismer et al.
3,737,294 A    6/1973   Dumbaugh, Jr.
(Continued)

FOREIGN PATENT DOCUMENTS

EP    2065181    6/2009
FR    2692255    12/1993
(Continued)

OTHER PUBLICATIONS

Translation of First Office Action; Japanese Patent App. No. 2014521630; dated Jun. 2, 2016.
(Continued)

*Primary Examiner* — Ibrahime A Abraham
*Assistant Examiner* — John J Norton

(57) ABSTRACT

Methods of fabricating a glass laminate is provided. According to one embodiment, a glass laminate comprised of a microwave absorbing layer and a microwave transparent layer is formed. The microwave absorbing layer is characterized by a microwave loss tangent $\delta_H$ that is at least a half order of magnitude larger than a loss tangent $\delta_L$ of the microwave transparent layer. An area of the glass laminate is exposed to microwave radiation. The exposed area comprises a cross-laminate hot zone having a cross-laminate hot zone temperature profile. Substantially all microwave absorbing layer portions of the hot zone temperature profile and substantially all microwave transparent layer portions of the hot zone temperature profile reside above the glass transition temperature $T_G$ of the various layers of the glass laminate prior to impingement by the microwave radiation.

(Continued)

In accordance with another embodiment, a method of fabricating a glass laminate is provided where the exposed area of the glass laminate is characterized by a viscosity below approximately $1\times10^4$ poise.

14 Claims, 2 Drawing Sheets

(51) Int. Cl.
    *C03C 23/00*     (2006.01)
    *C03B 17/06*     (2006.01)
    *C03B 17/02*     (2006.01)
    *C03B 18/12*     (2006.01)
    *C03B 23/023*     (2006.01)
    *C03B 27/012*     (2006.01)

(52) U.S. Cl.
    CPC ............ *C03B 18/12* (2013.01); *C03B 23/023* (2013.01); *C03B 23/0235* (2013.01); *C03B 27/012* (2013.01); *C03C 23/0065* (2013.01)

(58) Field of Classification Search
    CPC . C03B 27/012; C03B 23/023; C03B 23/0235; C03B 18/12
    See application file for complete search history.

(56) References Cited

U.S. PATENT DOCUMENTS

| | | |
|---|---|---|
| 3,746,526 A | 7/1973 | Giffen |
| 3,849,097 A | 11/1974 | Giffen et al. |
| 3,931,438 A | 1/1976 | Beall et al. |
| 4,102,664 A * | 7/1978 | Dumbaugh, Jr. .......... C03B 7/00 216/33 |
| 4,125,669 A | 11/1978 | Triebel et al. |
| 4,214,886 A | 7/1980 | Shay et al. |
| 4,234,533 A | 11/1980 | Langlands |
| 5,268,049 A | 12/1993 | Marriott et al. |
| 5,277,723 A | 1/1994 | Kodama et al. |
| 5,342,426 A | 8/1994 | Dumbaugh, Jr. |
| 5,559,060 A | 9/1996 | Dumbaugh, Jr. et al. |
| 5,656,053 A | 8/1997 | Boaz |
| 5,779,844 A | 7/1998 | Lewis et al. |
| 5,827,345 A | 10/1998 | Boaz et al. |
| 5,830,548 A | 11/1998 | Andersen et al. |
| 6,408,649 B1 | 6/2002 | Sklyarevich et al. |
| 6,598,426 B2 | 7/2003 | Vandal et al. |
| 6,829,909 B2 * | 12/2004 | Langsdorf ............... C03B 11/08 65/169 |
| 7,017,370 B1 | 3/2006 | Fotheringham et al. |
| 7,036,760 B2 | 5/2006 | Satoh |
| 7,063,760 B2 | 6/2006 | Sklyarevich et al. |
| 7,140,204 B2 | 11/2006 | Vandal |
| 7,201,965 B2 | 4/2007 | Gulati et al. |
| 7,207,193 B2 | 4/2007 | Xun et al. |
| 7,344,613 B2 | 3/2008 | Sklyarevich et al. |
| 7,414,001 B2 | 8/2008 | Helfinstine et al. |
| 7,430,880 B2 | 10/2008 | Butts et al. |
| 7,476,284 B2 | 1/2009 | Sklyarevich et al. |
| 7,514,149 B2 | 4/2009 | Bocko et al. |
| 7,681,414 B2 | 3/2010 | Pitbladdo |
| 7,685,740 B2 | 3/2010 | Sokolowski |
| 7,685,840 B2 | 3/2010 | Allaire et al. |
| 7,704,342 B2 | 4/2010 | Bourcier et al. |
| 7,754,337 B2 | 7/2010 | Hatta et al. |
| 7,818,980 B2 | 10/2010 | Burdette et al. |
| 8,007,913 B2 | 8/2011 | Coppola et al. |
| 8,096,337 B2 | 1/2012 | Morgan et al. |
| 8,211,505 B2 | 7/2012 | Bocko et al. |
| 8,821,345 B2 | 9/2014 | Noumura |
| 2004/0197575 A1 | 10/2004 | Bocko et al. |
| 2005/0150586 A1 | 7/2005 | Sklyarevich et al. |
| 2006/0231190 A1 | 10/2006 | Sklyarevich et al. |
| 2009/0100872 A1 | 4/2009 | Hawtof et al. |
| 2009/0100873 A1 * | 4/2009 | Allan .................... C03B 17/064 65/85 |
| 2009/0126859 A1 | 5/2009 | Cadwallader et al. |
| 2009/0217705 A1 | 9/2009 | Filippov et al. |
| 2009/0286013 A1 | 11/2009 | Cook et al. |
| 2010/0304520 A1 | 12/2010 | Hiyama |
| 2012/0085482 A1 | 4/2012 | Cadwallander et al. |

FOREIGN PATENT DOCUMENTS

| | | |
|---|---|---|
| JP | 5218654 | 8/1993 |
| JP | 2006024502 A | 1/2006 |
| WO | 9803517 | 1/1998 |
| WO | 9840324 | 9/1998 |
| WO | 199840324 | 9/1998 |
| WO | 0183387 | 11/2001 |
| WO | 2004094321 | 11/2004 |
| WO | 2009051649 | 4/2009 |
| WO | 2009064892 | 5/2009 |

OTHER PUBLICATIONS

2nd Chinese Office Action (English translation), dated Jun. 30, 2015, pp. 1-12, Chinese Application No. 201280034892, The State Intellectual Property Office of the People's Republic of China.
Kingery, et al., Introduction to Ceramics, 2d ed., 1960, p. 759-761, John Wiley & Sons, New York.
Zhang lian-meng, Fundamentals of Materials Science, dated Aug. 31, 2004, pp. 172-174, Wuhan University of Technology.
Wang nai-gang, Crystallization process of Family of Glass Ceramics containing MgO—Al2O3—SiO2—TiO2—CeO2 and their Microwave Dielectric Properties, Journal of Inorganic Materials, vol. 18, Section 3, dated May 31, 2003, pp. 547-552.
I. Ahmad, R. Silberglitt, "Joining Ceramics Using Microwave Energy", Mat. Res. Soc. Symp. Proc., vol. 314, 1993, pp. 119-130.
Noh et al., "Wafer bonding using microwave heating of parylene intermediate layers", Journal of Micromechanics and Microroengineerings 14, pp. 625-631, 2004.
Kharissova et al., :Review: The Use of Microwave Irradiation in the Processing of Glasses and Their Composites, Ind. Eng. Chem. Res 49; pp. 1457-1466, 2010.
Tanrattanakul et al., "Comparison Between Microwave and Thermal Curing of Glass Fiber-Epoxy Composites: Effect of Microwave-Heating Cycle on Mechanical Properties", Journal of Applied Polymer Science, vol. 102, pp. 1059-1070, 2006.
Veronesi et al., "Unique Microstructure of Glass-Metal Composites Obtained by Microwave Assisted Heat-Treatments", Journal of Thermal Analysis and Calorimetry, vol. 72, pp. 1141-1149, 2003.
Wikipedia—Glass Transition, Apr. 20, 2010, http://web.archive.org/web/20100420203505/http://en.wikipedia.org/wiki/Glass_transition.
Communication pursuant to Article 94(3) EPC, dated Jan. 20, 2015, pp. 1-6, European Application No. 12 733 303.7-1308, The European Patent Office, Germany.
Chinese office action (English translation), dated Dec. 2, 2014, pp. 1-11, Chinese Application No. 201280034892, The State Intellectual Property Office of the People's Republic of China.
PCT Search Report and Written Opinion dated Sep. 20, 2012, in corresponding PCT application No. PCT/US2012/043299, filed Jun. 20, 2012.
First Office Action (translation), dated Aug. 29, 2017, pp. 1-4, Japanese Patent Application No. 2016-214117, Japan Patent Office, Japan.

* cited by examiner

MICROWAVE-BASED GLASS LAMINATE FABRICATION

CROSS-REFERENCE TO RELATED APPLICATIONS

This application is a divisional of U.S. application Ser. No. 13/183,705, filed on Jul. 15, 2011, the content of which is relied upon and incorporated herein by reference in its entirety, and the benefit of priority under 35 U.S.C. § 120 is hereby claimed.

BACKGROUND

Field

The present disclosure relates to the fabrication of glass laminates.

Technical Background

Fabrication processes for glass laminates including laminated glass sheets, glass fibers, laminated rod and tube glass assemblies, and other glass lamintes typically require significant thermal control. Active control of viscosity, thermal stress and other thermal properties in these fabrication processes can be difficult.

BRIEF SUMMARY

The present inventors have recognized that traditional thermal approaches employed in the fabrication of glass laminates generally heat or cool from the outer layer of the laminate to the inner core layer of the laminate. This type of heating is non-selective with respect to the thermal properties of the various glass compositions of the laminate, which could for example comprise glass compositions with significantly different microwave absorption characteristics. These outer-to-inner, non-selective approaches are typically only able to change the temperature and viscosity of the outer glass layer efficiently and cannot address the specific requirements specific to forming, cutting, finishing, tempering, and reshaping the laminate.

Methods of fabricating glass laminates are provided herein that are well suited for the management of the thermal and viscosity profiles of various layers of a glass laminate, particularly where the layers represent outer and core glasses of a laminate structure. Fabrication methods of the present disclosure are also well suited for (i) minimizing thickness variations in the multiple layers of a fused glass laminate, (ii) controlling and optimizing the thermal field of the fabrication process for improved edge finishing of the glass laminate, particularly where the sheet comprises an exposed center-tensioned core, and (iii) fabrication processes where the glass laminate is formed into a three-dimensional (3D) shape, e.g., for handheld devices, TV cover glasses, and automotive, architectural, and appliance applications. For fabrication processes where a glass laminate is cut, the fabrication methods of the present disclosure can be used to maintain a desired temperature profile across the thickness of the laminated sheet to reduce center tension and mitigate potential fracture.

The present disclosure introduces fabrication processes that are capable of selectively heating target layers of a glass laminate and controlling the thermal and viscosity profile through the thickness of the glass laminate. Fabrication processes disclosed herein employ in-situ selective heating for managing the thermal profile of a multilayer glass laminate. More specifically, particular embodiments of the present disclosure employ microwave heating from approximately 300 MHz to approximately 300 GHz. This heating can be microwave-only heating or microwave heating can be used in combination with conventional heating approaches such as infrared (IR), convection and conduction.

The dielectric loss of a glass determines how susceptible the glass is to microwave heating. For example, in some embodiments, glass layers that are suitable for laminate fusion can exhibit significant differences between their respective dielectric losses. The microwave radiation heating techniques disclosed herein can be used to preferentially heat the glass layer with the higher dielectric loss and can even be used to give feedback to glass composition development to make glass layers with relatively large dielectric loss differences. The concepts of the present disclosure are not dependent upon the presence of a polymeric layer in the glass laminate. In fact, some embodiments of the present disclosure are particularly well-suited for the fabrication of glass laminates that are free of polymeric layers.

In accordance with one embodiment of the present disclosure, a method of fabricating a glass laminate is provided. According to the method, a glass laminate comprised of a microwave absorbing layer and a microwave transparent layer is formed. The microwave absorbing layer is characterized by a microwave loss tangent $\delta_H$ that is at least a half order of magnitude larger than a loss tangent $\delta_L$ of the microwave transparent layer. An area of the glass laminate is exposed to microwave radiation. The exposed area comprises a cross-laminate hot zone having a cross-laminate hot zone temperature profile. Substantially all microwave absorbing layer portions of the hot zone temperature profile and substantially all microwave transparent layer portions of the hot zone temperature profile reside above the glass transition temperature $T_G$ of the various layers of the glass laminate prior to impingement by the microwave radiation. The intensity distribution of the microwave radiation upon impingement with the glass laminate is sufficient to increase the temperature of the microwave absorbing layer portions of the hot-zone temperature profile to a greater extent than the temperature of the microwave transparent layer portions of the hot-zone temperature profile. In accordance with another embodiment of the present disclosure, a method of fabricating a glass laminate is provided where the exposed area of the glass laminate is characterized by a viscosity below approximately $1 \times 10^4$ poise.

Although the concepts of the present disclosure are described herein with primary reference to fusion draw fabrication, it is contemplated that the concepts will enjoy applicability to any glass laminate fabrication process where the glass is subject to microwave radiation at relatively low viscosities. For example, and not by way of limitation, it is contemplated that the concepts of the present disclosure will enjoy applicability to preform draw processes, rolling processes, float processes, and other conventional and yet to be developed relatively high temperature fabrication processes and are not limited to sheet glass fabrication as other glass material processes are envisioned such as fibers, tubes, etc.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Methods of fabricating glass laminates in accordance with the teachings of the present disclosure can be conveniently illustrated with reference to the double isopipe fusion process illustrated schematically in FIG. 1, the details of which can be readily gleaned from available teachings in the art including, for example, Corning Incorporated U.S. Pat. Nos. 4,214,886, 7,207,193, 7,414,001, 7,430,880, 7,681,414, 7,685,840, 7,818,980, international publication WO 2004094321 A2, and PG Pub No. US 2009-0217705 A1.

Figure 1:
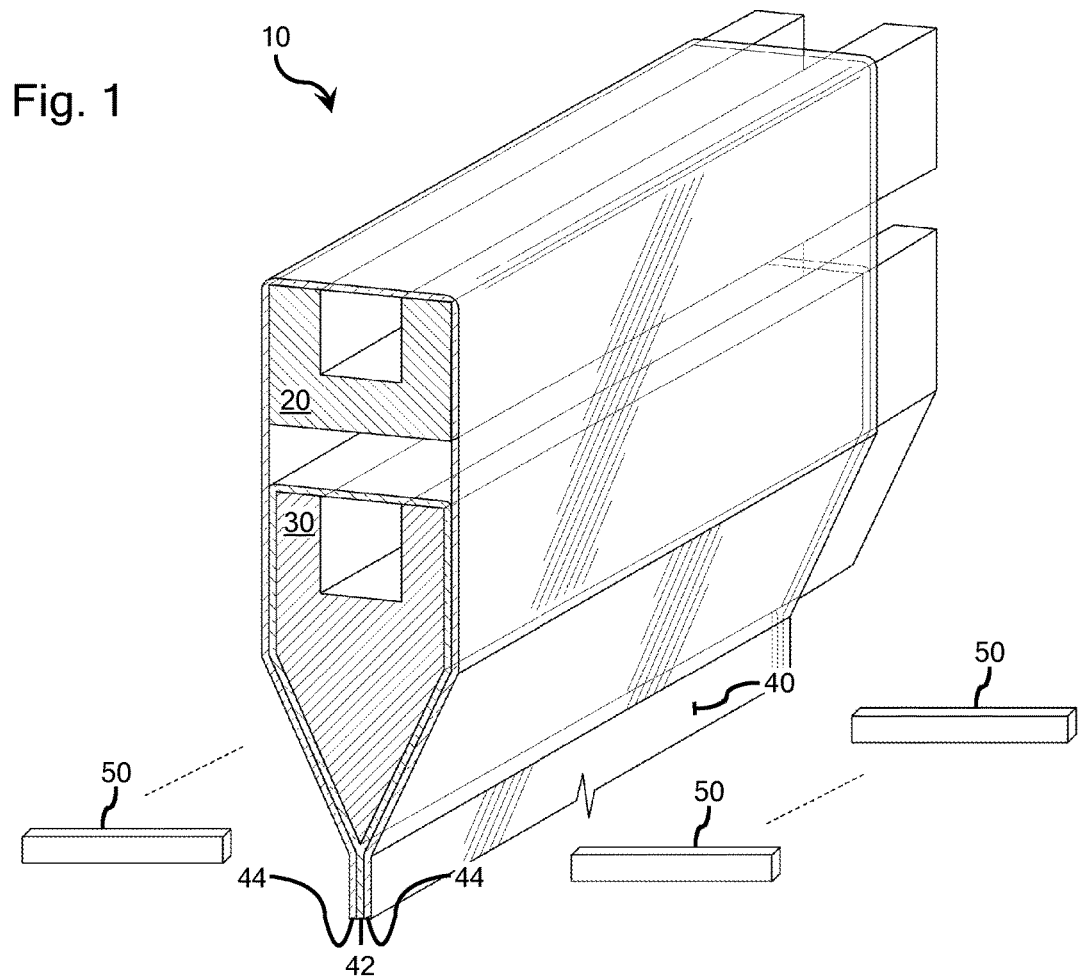
FIG. 1 is a schematic illustration of a double isopipe fusion process incorporating microwave heating technology of the present disclosure.

As is illustrated in FIG. 1, in a laminate fusion process 10, molten outer layer glass overflows from an upper isopipe 20 and merges with the core glass at the weir level of a bottom isopipe 30. The two sides merge and a three-layer flat laminated sheet 40 comprising respective core and outer layers 42, 44 forms at the root of the core isopipe. The laminate sheet 40 can pass through several thermal zones for sheet shape and stress management and is then cut at the bottom of the draw. The resulting flat laminated sheet 40 can be further processed to have a 3D shape for applications such as handheld device and TV cover glass. It is noted that the outer layers 44, which may form the skin or cladding of the glass laminate, might not be the outermost layers of the finished laminate, in some instances.

Figure 2:
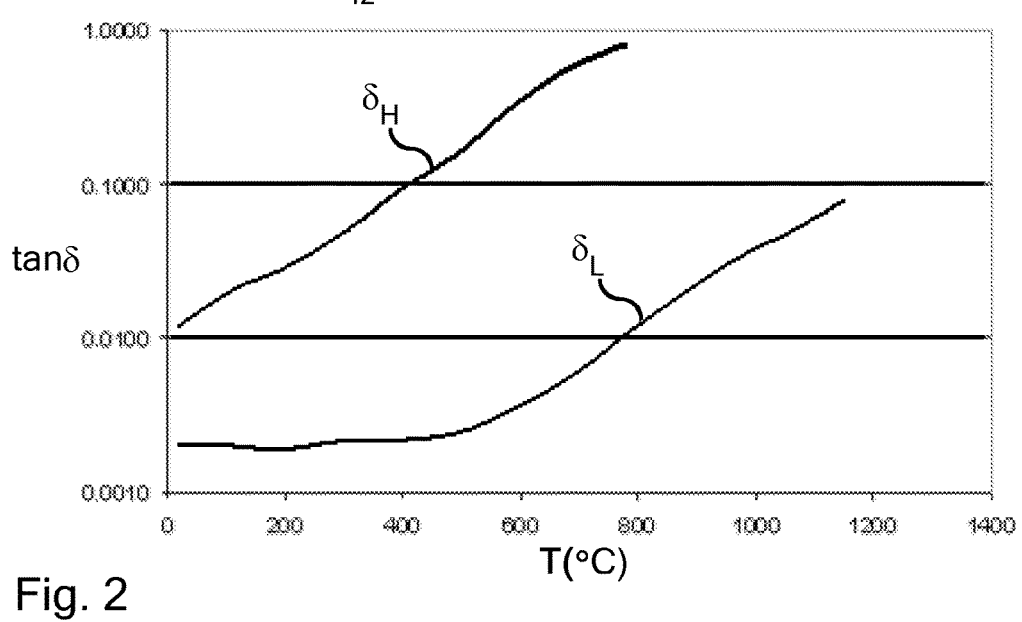
FIG. 2 illustrates loss tangent differential Δδ data of a laminated glass sheet according to the present disclosure.

According to the methodology of the present disclosure, glass laminates, i.e., a laminated glass sheet 40 in the illustrated embodiment, comprises a microwave absorbing layer, which may be the core layer 42 or the outer layers 44, and a microwave transparent layer, which will be either the core layer 42 or the outer layer 44, as determined by the choice of absorbing layer. The concepts of the present disclosure will enjoy applicability where the glass laminate comprises a microwave absorbing core layer sandwiched between microwave transparent outer layers or a microwave transparent core layer sandwiched between microwave absorbing outer layers. For the purposes of illustration, the core layer 42 is designated herein as the microwave absorbing layer and the outer layers 44 are designated herein as the microwave transparent layers. Reference herein to microwave "absorbing" layers or materials and microwave "transparent" layers or materials should not be taken to require 100% absorption or transmission of microwave energy. Rather, the terms are utilized herein in the relative sense such that an "absorbing" layer/material transmits less microwave radiation than a "transparent" layer/material, and vice versa. For example, to facilitate differential heating of the laminated glass sheet 40, the microwave absorbing layer 42 can have a microwave loss tangent $\delta_H$ that is at least a half order of magnitude larger than a loss tangent $\delta_L$ of the microwave transparent layers 44, at least at one or more temperature points where the glass laminate exhibits a viscosity of between approximately $1 \times 10^2$ poise and approximately $1 \times 10^{13.3}$ poise. FIG. 2 illustrates an embodiment where the microwave absorbing layer 42 can be characterized by a microwave loss tangent $\delta_H$ that is at least a half order of magnitude larger than a loss tangent $\delta_L$ of the microwave transparent layers 44, across the entire illustrated temperature range. In fact, the microwave absorbing layer illustrated in FIG. 2 has a microwave loss tangent $\delta_H$ that is a full order of magnitude larger than a loss tangent $\delta_L$ of the microwave transparent layers over the majority of the temperature range illustrated in FIG. 2. It is noted that a "half order" magnitude is presented herein to represent a magnitude that is one-half the magnitude associated with a full order of magnitude at the specified data reference. More specifically, if a full order of magnitude represents a tenfold difference between two values at a give temperature, then the half order magnitude at the same temperature would represent a fivefold difference between the two values.

In practice, it will often be beneficial to ensure that the loss tangent $\delta_H$ is at least a half order of magnitude larger than the loss tangent $\delta_L$ over a wide range of viscosities. The loss tangent δ of a glass is defined as the factor of dielectric loss divided by dielectric constant and is a parameter of the glass that quantifies the dissipation of electromagnetic energy in the glass. Generally, glasses with relatively high microwave loss tangents $\delta_H$ will absorb relatively large amounts of microwave energy, while glasses with relatively low microwave loss tangents $\delta_L$ will absorb relatively small amounts of microwave energy. The difference between the respective loss tangents of two different materials in a glass laminate at a given temperature with a specified temperature range is referred to herein as the loss tangent differential Δδ of the glass sheet.

Microwave absorbing glass compositions may inherently be microwave absorbing, such as those with high alkali content, or may be rendered microwave absorbing through the incorporation of specific microwave absorbing components to the glass composition. Similarly, microwave transparent glass compositions may inherently be microwave absorbing or may be rendered transparent through the addition of components selected to enhance microwave transparency. Concepts of the present disclosure are not limited to specific glass compositions.

Two important parameters for microwave processing are power absorption P and depth of microwave penetration D. Unlike conventional heating, these parameters are highly dependent on the dielectric properties of the material and the frequency of the microwave radiation. Each of these parameters can be tailored to provide a wide range of process flexibility. Power absorption P can be defined as follows:

$$P = \sigma |E|^2 = 2\pi f \varepsilon_0 \varepsilon_{eff}'' |E|^2 = 2\pi f \varepsilon_0 \varepsilon_r' \tan \delta |E|^2$$

where |E| is the magnitude of the internal electric field, $\varepsilon_{eff}''$ is the relative effective dielectric loss factor, $\varepsilon_0$ is the permittivity of free space, f is the microwave frequency, σ is the total electric conductivity, $\varepsilon_r'$ is the relative dielectric constant, and tan δ is the loss tangent, which is the energy loss required to store a given quantity of energy. As can be seen from the equation above, the dielectric properties of the material assume a significant role in the extent of power absorbed by the material. The majority of the absorbed microwave power is converted to heat in the material, as follows:

$$\frac{\partial T}{\partial t} = \frac{P}{\rho C_p} = \frac{2\pi f \varepsilon_0 \varepsilon_r' \tan\delta |E|^2}{\rho C_p}$$

where T is the temperature, t is the time, ρ is the density, and $C_p$ is the heat capacity. This equation also shows that heating rate is directly proportional to the loss tangent of a glass.

This shows that the heating rate of the microwave-absorbing layer of a glass laminate will be much higher than that of the microwave-transparent layer of the same laminate.

The dielectric properties of a material also play a significant role in determining the depth to which microwaves will penetrate into the material. As can be seen from the following equation, increasing values of tan δ and $\varepsilon_r'$ will yield progressively smaller depths of penetration for a specific wavelength:

$$D = \frac{3\lambda_0}{8.68\pi\tan\delta\left(\frac{\varepsilon_r'}{\varepsilon_0}\right)^{1/2}}$$

where D is the depth of penetration at which the incident power is reduced by one half and $\lambda_0$ is the microwave wavelength (See Sutton, "Microwave Processing of Ceramic Materials", American Ceramic Society Bulletin, Vol. 68, No. 2, 1989). Depth of penetration can be important in determining the uniformity of heating throughout a given material. Generally, relatively high frequencies and large dielectric loss properties will result in surface heating, while relatively low frequencies and small dielectric loss properties will result in more volumetric heating.

Microwave-transparent glass will be nearly unaffected by microwave radiation and hence microwave radiation can pass through it with almost no loss of energy. In contrast, microwave absorbing glass couples well with microwave radiation and dissipates the microwave radiation into heat. This type of microwave heating may be volumetric and, as such, microwave absorbing glass layer(s), whether an outer or an inner layer of a glass laminate, can be preferentially and selectively heated over one or more of the other layers making up the glass sheet.

In the illustrated embodiment, an area of the laminated glass sheet 40 is exposed to microwave radiation originating from microwave generators 50 (illustrated schematically in FIG. 1). The exposed area of the sheet 40 comprises a cross-sheet hot zone having a cross-sheet hot zone temperature profile that includes microwave absorbing layer portions corresponding to the core 42 of the sheet 40 and microwave transparent layer portions corresponding to the outer layers 44 of the sheet 40. In this area of the laminated glass sheet 40, the glass sheet is already a heated glass sheet. More specifically, prior to microwave treatment, substantially all of the microwave absorbing layer portions and substantially all of the microwave transparent layer portions of the glass sheet reach a temperature or temperatures that are above the glass transition temperature $T_G$ of the various layers of the laminated glass sheet 40. The glass layers may reach $T_G$ via conventional heating, microwave heating, or a combination of the two. The microwave radiation generated by the sources 50 increases the temperature of the microwave absorbing layer portions to a greater extent than the temperature of the microwave transparent layer portions. This differential heating can be used for a variety of purposes. For example, the differential heating contemplated herein can be used to manage various fabrication parameters of the laminated glass sheet throughout the fabrication process. Contemplated fabrication parameters include, but are not limited to, thermal profile management, thickness control, viscosity control, stress control, etc. In some contemplated embodiments, the glass sheet fabrication process is concluded with a cutting operation downstream of the differential heating described herein.

Figure 3:
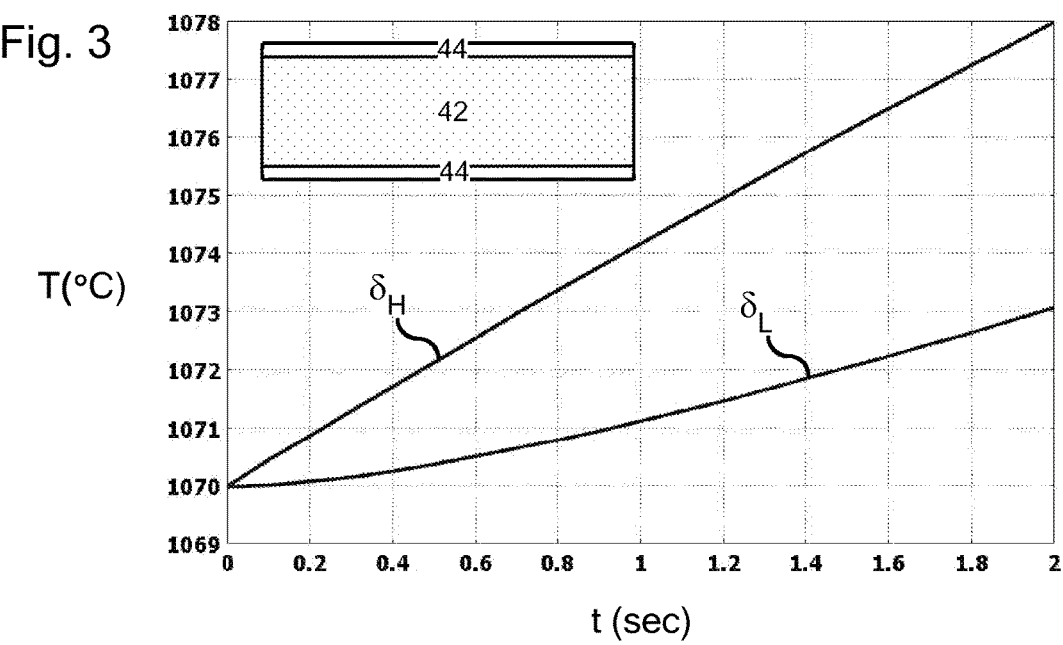
FIG. 3 illustrates the heating characteristics of a laminated glass sheet comprising a microwave absorbing core layer sandwiched between microwave transparent outer layers.
Figure 4:
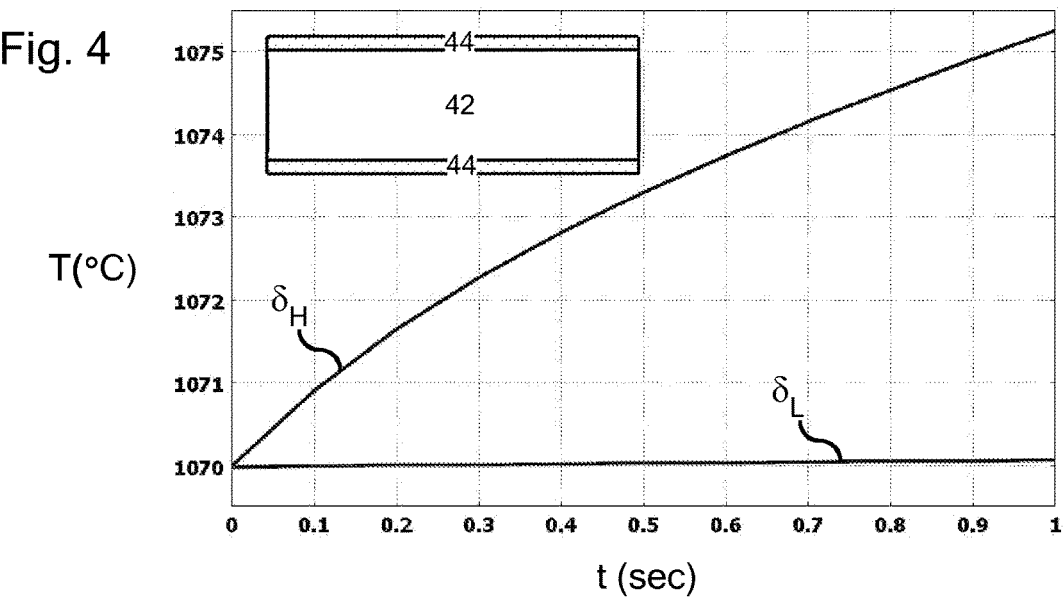
FIG. 4 illustrates the heating characteristics of a laminated glass sheet comprising a microwave transparent core layer sandwiched between microwave absorbing outer layers.

It is contemplated that the entire hot zone temperature profile, including the absorbing and transparent layer portions, may reside above the glass transition temperature $T_G$. In many cases, the entire hot zone temperature profile will reside above the liquidus temperature of the various layers of the glass laminate. In particular embodiments and by way of example, the intensity distribution of the microwave radiation on impingement with the glass laminate can readily be tailored to increase the temperature of the microwave absorbing layer portions of the hot-zone temperature profile at a rate that is faster than the rate at which heat diffuses through the glass thickness. For example, contemplated heating rates are illustrated in FIG. 3, which illustrates heating for a laminated glass sheet comprising a microwave absorbing core portion 42 characterized by a relatively high microwave loss tangent $\delta_H$, and FIG. 4, which illustrates heating for a laminated glass sheet comprising a microwave absorbing cladding portions 44 characterized by a relatively high microwave loss tangent $\delta_H$.

In practicing the concepts of the present disclosure, it will often be convenient to refer to the viscosity of the respective glass compositions of the microwave absorbing layer and the microwave transparent layer. In some embodiments, it may be preferable to select respective glass compositions of the microwave absorbing layer and the microwave transparent layer to exhibit a viscosity below approximately $1\times10^5$ poise at 1200° C. and to expose an area of the glass laminate to the microwave radiation when the various layers of the laminate are below the stated viscosity. It is also contemplated that the respective glass compositions of the microwave absorbing layer and the microwave transparent layer can be selected to exhibit a viscosity below approximately 100 poise at 900° C. and that the microwave exposure can occur where the various layers of the laminate are characterized by a viscosity below approximately $1\times10^2$ poise.

As is illustrated schematically in FIG. 1, the microwave radiation originates from one or more microwave sources 50 and can be relatively diffuse, as would be the case when using a multi-mode cavity, or relatively focused, as would be the case when using single mode microwave source processing. For relatively focused sources, it is contemplated that, in some embodiments, the microwave source would be a relatively high frequency source, i.e., a gyrotron operating at approximately 28 GHz, and the energy could be directed at a specific point or deflected to a specific area using polished mirrors or other microwave reflecting surfaces. It is contemplated that focused exposure may be beneficial for small items, or where the target area of a glass laminate is relatively small.

These sources can be collectively configured with respect to power and frequency for substantially complete cross-layer penetration of the laminated glass sheet. In various embodiments of the methods disclosed herein, it is noted that microwave radiation comprises electromagnetic waves with wavelengths ranging from as long as one meter to as short as one millimeter, or equivalently, with frequencies between 300 MHz (0.3 GHz) and 300 GHz. Particular embodiments of the present disclosure utilize microwave radiation of approximately 2.45 GHz or in the C-band (5.8-7 GHz) at approximately 1000 W. In some embodiments, it will not be unusual to require that the microwave radiation originate from sources that are collectively configured with respect to power and frequency for laminated glass sheet penetration of at least approximately 0.5 mm (depth).

Although FIG. 1 illustrates an embodiment where a laminated glass sheet is exposed to microwave radiation near the bottom core isopipe root in a double isopipe fusion process, it is contemplated that the concepts of the present disclosure will enjoy applicability to any application where a laminate sheet in a hot zone of any fusion draw process is exposed to microwave radiation including, but not limited to, aluminosilicate, borosilicate, and alkali aluminosilicate fusion draw processes. As used herein, it is noted that a "hot zone" in a glass laminate fabrication process is any zone where supplemental heat sources direct heat towards the glass laminate prior to cutting the sheet or any zone where the sheet is not actively cooled prior to cutting the sheet. In some embodiments, such as for a double isopipe fusion process, microwave radiation can exposes the laminate "near" the bottom core isopipe root, with the understanding that the term "near" denotes a condition where a majority of the radiant energy intensity distribution impinges upon the laminated glass sheet within approximately one meter of the bottom core isopipe root.

Additional contemplated applications will more generally relate to processes where the glass laminate is formed by passage through one or more thermal zones to manage fabrication parameters of the glass laminate, which may be subsequently cut downstream of the thermal zones. In such cases, the microwave radiation will originate from one or more microwave sources collectively configured to generate microwave exposure of a glass laminate in one or more of the thermal zones. Where a microwave absorbing core layer is sandwiched between microwave transparent outer layers of the glass laminate, the microwave radiation and the thermal zone can cooperate to control a thickness dimension of the microwave absorbing core layer. Where the microwave transparent layer is presented as a microwave transparent core layer sandwiched between microwave absorbing outer layers and the microwave radiation cooperate to control edge finishing of the microwave absorbing outer layers. More specifically, for laminate glass sheet edge finishing, the methodology disclosed here can be used to preferentially heat and melt a microwave-absorbing cladding while leaving the core layer colder, more viscous, and stiffer than as if only IR heating was used. A laminated sheet with molten clad layers and a solid, non-molten core can be used to fabricate pristine finished edges with superior attributes compared to the cases where both clad and core layers are molten.

In an additional contemplated embodiment, the laminated glass sheet is presented in a 3D laminated glass sheet forming mold, the microwave transparent layer is presented as the outer layer, and the microwave absorbing layer is presented as the core layer. The mold is exposed to microwave radiation and the core and outer layers are composed such that the loss tangent differential $\Delta\delta$ of the laminated glass sheet is sufficiently large to increase the temperature of the microwave absorbing core layer to permit molding of the laminated glass sheet within the mold while inhibiting thermally induced forming or reaction of the outer layer with a mold surface of the mold. More specifically, the selective heating methodology of the present disclosure can increase mold lifetime in 3D forming of laminated glass sheets because it facilitates preferential heating of the microwave-absorbing core, while leaving the clad relatively unheated. As a result, the relatively cool outer layers will be less likely to react with or form themselves to the mold, thus improving both mold lifetime and surface quality. Mold coatings, if used, can also be designed to be microwave transparent.

It is further contemplated that the techniques presented herein may be utilized in processes facilitating inter-diffusion and devitrification between clad-core interfaces of a glass laminate and processes for optimizing thermal management across the thickness of the glass laminate. The concepts of the present disclosure may also be used to enhance thermal tempering for a glass laminate. For example, for laminates comprising one or more a microwave-absorbing core layers and one or more microwave-transparent outer layers, the less heated outer layers act as heat sinks and hence enhance the temperature difference between core and outer layers.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

The invention claimed is:

1. A method comprising:
    contacting a molten microwave absorbing glass with a molten microwave transparent glass in a double isopipe fusion process to form a glass laminate;
    exposing an area of the glass laminate to microwave radiation, wherein:
    the exposed area of the glass laminate glass is near a bottom core isopipe root of the double isopipe fusion process;
    the glass laminate comprises a microwave absorbing layer and a microwave transparent layer, and a microwave loss tangent $\delta_H$ of the microwave absorbing layer is at least a half order of magnitude larger than a microwave loss tangent $\delta_L$ of the microwave transparent layer, at least at one or more temperature points at which the glass laminate exhibits a viscosity of between approximately $1 \times 10^2$ poise and approximately $1 \times 10^{13.3}$ poise; and in the exposed area of the glass laminate, each of the microwave absorbing layer and the microwave transparent layer is at a temperature above a glass transition temperature $T_G$ of the respective layer prior to exposure to the microwave radiation.

2. The method of claim 1, wherein an intensity distribution of the microwave radiation upon impingement with the glass laminate is sufficient to increase a temperature of the microwave absorbing layer to a greater extent than a temperature of the microwave transparent layer.

3. The method of claim 1, wherein the exposed area of the glass laminate comprises a viscosity below approximately $1 \times 10^5$ poise prior to exposure to the microwave radiation.

4. The method of claim 1, wherein each of the microwave absorbing layer and the microwave transparent layer comprises a viscosity below approximately $1 \times 10^5$ poise at 1200° C.

5. The method of claim 1, wherein:
the exposed area of the glass laminate comprises a cross-laminate hot zone having a cross-laminate hot zone temperature profile; and
an intensity distribution of the microwave radiation upon impingement with the glass laminate is sufficient to increase a temperature of the microwave absorbing layer portions of the hot zone temperature profile to a greater extent than a temperature of the microwave transparent layer portions of the hot zone temperature profile.

6. The method of claim 5, wherein the microwave absorbing layer portions of the hot zone temperature profile and the microwave transparent layer portions of the hot zone temperature profile reside above the glass transition temperature $T_G$ of the various layers of the glass laminate.

7. The method of claim 1, wherein, in the exposed area of the glass laminate, each of the microwave absorbing layer and the microwave transparent layer is at a temperature above approximately 900° C. prior to exposure to the microwave radiation.

8. The method of claim 1, wherein, in the exposed area of the glass laminate, each of the microwave absorbing layer and the microwave transparent layer is at a temperature above a liquidus temperature of the respective layer prior to exposure to the microwave radiation.

9. The method of claim 1, wherein the microwave radiation originates from one or more microwave sources collectively configured with respect to power and frequency for substantially complete cross-laminate penetration of the glass laminate.

10. The method of claim 1, wherein the microwave radiation originates from one or more microwave sources collectively configured with respect to power and frequency for penetration of at least approximately 0.5 mm into the glass laminate.

11. The method of claim 1, wherein the glass laminate comprises a microwave absorbing core layer sandwiched between microwave transparent outer layers or a microwave transparent core layer sandwiched between microwave absorbing outer layers.

12. The method of claim 1, wherein:
the microwave transparent layer comprises a pair of microwave transparent outer layers of the glass laminate; and
the microwave absorbing layer comprises a microwave absorbing core layer sandwiched between the microwave transparent outer layers of the glass laminate.

13. The method of claim 1, wherein:
the microwave transparent layer comprises a pair of microwave transparent outer layers; and
the microwave absorbing layer comprises a microwave absorbing core layer sandwiched between the pair of microwave transparent outer layers.

14. The method of claim 1, wherein:
the microwave absorbing layer is a microwave absorbing glass layer;
the microwave transparent layer is a microwave transparent glass layer; and
the glass laminate comprises the microwave absorbing layer fused to the microwave transparent layer.

* * * * *

UNITED STATES PATENT AND TRADEMARK OFFICE
CERTIFICATE OF CORRECTION

PATENT NO. : 10,099,954 B2  
APPLICATION NO. : 14/743415  
DATED : October 16, 2018  
INVENTOR(S) : Hilary Tony Godard et al.

Page 1 of 1

It is certified that error appears in the above-identified patent and that said Letters Patent is hereby corrected as shown below:

On the Title Page

On page 2, Column 2, item (56), other publications, Lines 15-16, delete "Micoroengineerings" and insert -- Microengineerings --, therefor.

In the Claims

In Column 9, Line 4, Claim 1, delete "$1 \times 10^{133}$" and insert -- $1 \times 10^{13.3}$ --, therefor.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*